(12) United States Patent
Min (10) Patent No.: US 8,456,878 B2
(45) Date of Patent: Jun. 4, 2013

(54) POWER STORAGE SYSTEM AND METHOD OF CONTROLLING THE SAME

(75) Inventor: Byeong-Seon Min, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 336 days.

(21) Appl. No.: 12/923,246

(22) Filed: Sep. 10, 2010

(65) Prior Publication Data

US 2011/0210614 A1    Sep. 1, 2011

(30) Foreign Application Priority Data

Feb. 26, 2010   (KR) .......................... 10-2010-0017918

(51) Int. Cl.
*G05F 1/67* (2006.01)
(52) U.S. Cl.
USPC .............................. 363/95; 323/222; 323/906
(58) Field of Classification Search
USPC .......... 323/906, 222; 363/95, 97, 98; 307/152
See application file for complete search history.

(56) References Cited

U.S. PATENT DOCUMENTS

| | | | |
|---|---|---|---|
| 5,923,158 A | | 7/1999 | Kurokami et al. |
| 7,888,919 B2* | | 2/2011 | Dishman et al. ............. 323/266 |
| 8,228,697 B2* | | 7/2012 | Wagoner ........................ 363/95 |
| 2008/0084117 A1 | | 4/2008 | Sander et al. |

FOREIGN PATENT DOCUMENTS

| | | |
|---|---|---|
| JP | 08-088980 A | 4/1996 |
| JP | 2004-180467 A | 6/2004 |
| JP | 2009-033802 A | 2/2009 |
| KR | 10-2006-0011337 A | 2/2006 |
| KR | 10-2008-0092747 A | 10/2008 |

OTHER PUBLICATIONS

Korean Office Action in KR 10-2010-0017918, dated May 19, 2011.

* cited by examiner

*Primary Examiner* — Harry Behm
(74) *Attorney, Agent, or Firm* — Lee & Morse, P.C.

(57) ABSTRACT

A power storage system and a method of controlling the same include supplying power to a load by connecting a power generation system and a grid. The system includes a power converting unit that operates in one of at least two control modes including a maximum power point tracking control mode in which the power generation system is controlled to generate maximum power and a voltage control mode in which a boosting ratio is adjusted according to a change in the amount of power consumed by a load. The system also includes a direct current (DC)/DC converter for converting an output voltage of the power converting unit into a DC link voltage, an inverter for converting the DC link voltage into an alternating current (AC) voltage appropriate for the grid, and a central controller for controlling operations of the power converting unit, the DC/DC converter, and the inverter.

16 Claims, 8 Drawing Sheets

POWER STORAGE SYSTEM AND METHOD OF CONTROLLING THE SAME

BACKGROUND

1. Field

One or more embodiments of the present invention relate to a power storage system and a method of controlling the same.

2. Description of the Related Art

As problems, such as environmental contamination and resource exhaustion, have increased, interest in systems for storing power and efficiently using the stored power has increased. Interest in renewable energy that does not cause pollution during power generation has also increased. Thus, research into power storage systems, which may be used with renewable energy, a power storage battery, and existing grid power, has been actively conducted as changes occur in domestic and overseas environments.

SUMMARY

Embodiments are therefore directed to a power storage system and method of controlling the same, which substantially overcome one or more of the problems due to the limitations and disadvantages of the related art.

It is therefore a feature of an embodiment to provide a power storage system that may quickly respond to a change in the amount of power consumed by a load and a method of controlling the power storage system.

Additional aspects will be set forth in part in the description which follows and, in part, will be apparent from the description, or may be learned by practice of the presented embodiments.

According to one or more embodiments of the present invention, a power storage system for supplying power to a load by connecting a power generation system and a grid includes a power converting unit operating in any one control mode of a maximum power point tracking control mode in which the power generation system is controlled to generate maximum power and a voltage control mode in which a boosting ratio is adjusted according to a change in an amount of power consumed by a load, a direct current (DC)/DC converter for converting an output voltage of the power converting unit into a DC link voltage, an inverter for converting the DC link voltage into an alternating current (AC) voltage appropriate for the grid, and an integrated controller for controlling operations of the power converting unit, the DC/DC converter, and the inverter.

The control mode may be determined according to the change in the amount of power consumed by the load.

The power storage system may further include a power measuring unit for measuring the amount of power consumed by the load, wherein the power converting unit operates in the voltage control mode if the change in the amount of power consumed by the load is equal to or greater than a reference amount of power, and operates in the MPPT control mode if the change in the amount of power consumed by the load is less than the reference amount of power.

The voltage control mode may be a mode in which the boosting ratio is adjusted in proportion to the change in the amount of power consumed by the load.

The reference amount of power may be determined so that a time taken to change the output voltage of the power converting unit to a target voltage in the voltage control mode is equal to or less than a time taken to change the output voltage of the power converting unit to the target voltage in the MPPT control mode.

The power measuring unit may include a voltage measuring unit for measuring a voltage applied to the load, and a current measuring unit for measuring a current supplied to the load, wherein the integrated controller calculates the amount of power consumed by the load by multiplying the voltage by the current.

The power converting unit may operate in the voltage control mode if a change in the DC link voltage is equal to or greater than a reference voltage, and operate in the MPPT control mode if the change in the DC link voltage is less than the reference voltage.

The voltage control mode may be a mode in which the boosting ratio is adjusted according to the change in the DC link voltage.

The boosting ratio may be adjusted by adjusting a duty ratio of a switching element included in the power converting unit.

According to one or more embodiments of the present invention, a method of controlling a power storage system for supplying power to a load by connecting a power generation system and a grid, the method including determining any one control mode of an MPPT control mode in which the power generation system is controlled to generate maximum power and a voltage control mode in which a boosting ratio is adjusted according to a change in an amount of power consumed by a load; converting power generated by the power generation system into power having a DC link voltage in the determined control mode, and converting the power having the DC link voltage into power having an alternating current (AC) voltage appropriate for the grid.

The control mode may be determined according to the change in the amount of power consumed by the load.

The method may further include measuring the amount of power consumed by the load, wherein the voltage control mode is determined as the control mode if the change in the amount of power consumed by the load is equal to or greater than a reference amount of power, and the MPPT control mode is determined as the control mode if the change in the amount of power consumed by the load is less than the reference amount of power.

The method may further include measuring the DC link voltage, wherein the voltage control mode is determined as the control mode if a change in the DC link voltage is equal to or greater than a reference voltage, and the MPPT control mode is determined as the control mode if the change in the DC link voltage is less than the reference voltage.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION

Korean Patent Application No. 10-2010-0017918, filed on Feb. 26, 2010, in the Korean Intellectual Property Office, and entitled: "Power Storage System and Method of Controlling the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawings, the same elements are denoted by the same reference numerals, and a repeated explanation thereof will not be given.

Figure 1:
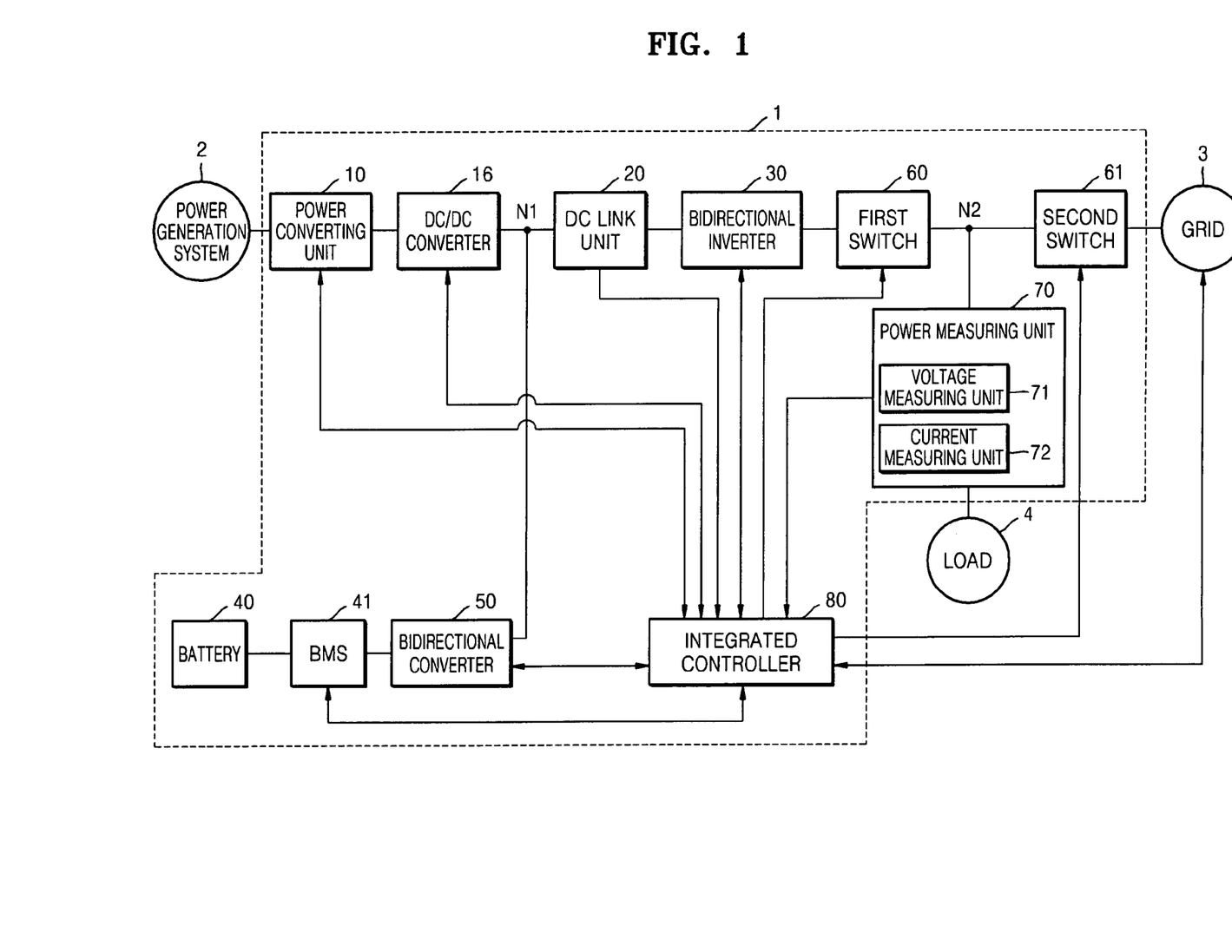
FIG. 1 illustrates a block diagram of a power storage system according to an embodiment of the present invention.
Figure 2:
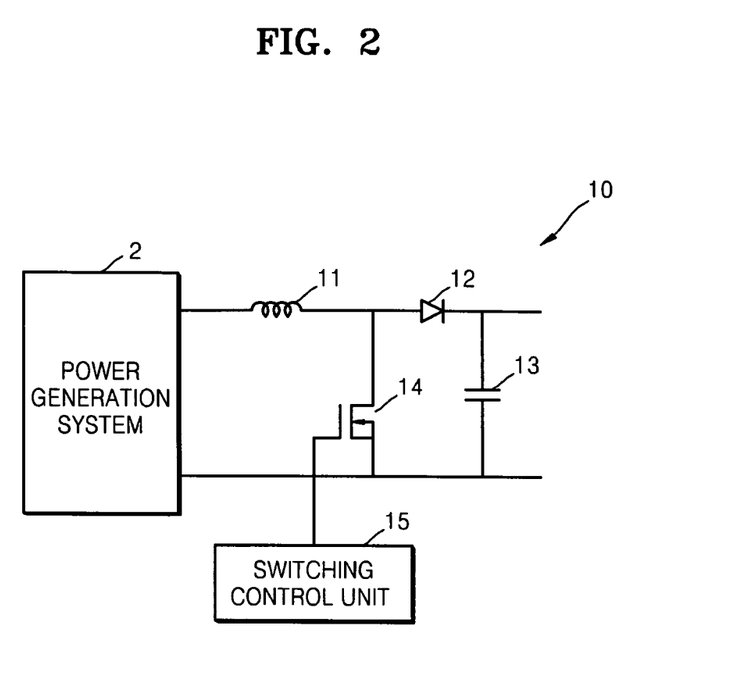
FIG. 2 illustrates a circuit diagram of a power converting unit of the power storage system of FIG. 1.

FIG. 1 illustrates a block diagram of a power storage system 1 according to an embodiment of the present invention. FIG. 2 illustrates a circuit diagram of a power converting unit 10 of the power storage system of FIG. 1.

Referring to FIG. 1, the power storage system 1 supplies power to a load 4 in conjunction with a power generation system 2 and a grid 3.

The power generation system 2 is a system that generates power by using an energy source. The power generation system 2 supplies the generated power to the power storage system 1. The power generation system 2 supplies the generated power to the power storage system 1. The power generation system 2 may include a plurality of power generation modules arranged in parallel with each other, and may generate power via each of the power generating modules, so that the power generation system 2 may be a large capacity energy system.

The power generation system 2 may be a solar power generation system, a wind power generation system, or a tidal power generation system. However, embodiments are not limited thereto, and the power generation system 2 may be any power generation system that may generate power by using renewable energy such as solar heat or geothermal heat. In particular, a solar cell that generates electric energy using sunlight is easily installed in a house or a factory. Thus, solar cells, which may be distributed among many houses, may be used with the power storage system 1.

The grid 3 may include a power plant, a substation, power lines, and the like. If the grid 3 is in a normal state, the grid 3 supplies power to the power storage system 1 or the load 4, or receives power supplied from the power storage system 1. If the grid 3 is in an abnormal state, the grid 3 supplies power to neither the power storage system 1 nor the load 4, and the power storage system 1 stops supplying power to the grid 3.

The load 4 consumes power generated by the power generation system 2, power stored in a battery 40, or power supplied from the grid 3. The load 4 may be, e.g., a house, a factory, and so forth.

The power storage system 1 may store power generated by the power generation system 2 in the battery 40 or may send the generated power to the grid 3. The power storage system 1 may deliver power stored in the battery 40 to the grid 3, or store power supplied from the grid 3 in the battery 40. In an abnormal situation, for example, if there is a power failure in the grid 3, the power storage system 1 may supply power to the load 4 by performing an uninterruptible power supply (UPS) operation. Even if the grid 3 is in a normal state, the power storage system 1 may supply power generated by the power generation system 2 or power stored in the battery 40 to the load 4.

The power storage system 1 may include the power converting unit 10, a direct current (DC)/DC converter 16, a DC link unit 20, a bidirectional inverter 30, the battery 40, a battery management system (BMS) 41, a bidirectional converter 50, a first switch 60, a second switch 61, a power measuring unit 70, and an integrated controller 80.

The power converting unit 10 is connected between the power generation system 2 and the DC/DC converter 16, and delivers power generated by the power generation system 2 to the DC/DC converter 16. The power converting unit 10 may operate in a maximum power point tracking (MPPT) control mode or a voltage control mode under the control of the integrated controller 80.

The MPPT control mode is a mode in which the power converting unit 10 operates to obtain maximum power output from the power generation system 2, which may be a solar power generation system. For example, if the power generation system 2 is a solar power generation system, a voltage (V)-current (I) curve and a power (P)-voltage (V) curve of a solar cell constituting the solar power generation system vary nonlinearly according to the external conditions such as solar radiation, temperature, load, or the like. The MPPT control mode is a mode in which a single operating point where maximum power output from the solar cell is obtained under given external conditions (referred to as a maximum power point) is tracked.

The voltage control mode is a mode in which a boosting ratio at which an output voltage of power generated by the power generation system 2 is boosted is adjusted by the power converting unit 10 according to specific external conditions. In FIG. 1, the voltage control mode is performed by adjusting a boosting ratio according to specific external conditions, for example, a change in the amount of power consumed by the load 4.

Referring to FIG. 2, the power converting unit 10 may include an inductor 11, a diode 12, a capacitor 13, a switching element 14, and a switching control unit 15.

The switching control unit 15 controls the switching element 14 to be turned on or off. In the MPPT control mode, the switching control unit 15 determines a voltage and a current by controlling the switching element 14 to be turned on or off according to an MPPT algorithm so the power generation system 2 outputs maximum power. In the voltage control mode, the switching control unit 15 receives a duty ratio from the integrated controller 80, and adjusts a boosting ratio by controlling the switching element 14 to be turned on or off according to the duty ratio.

The switching element 14 controls the voltage and the current output from the power generation system 2 by being controlled by the switching control unit 15 to be turned on or off. That is, the switching element 14 controls the voltage and the current output from the power generation system 2 to be maintained at predetermined levels in conjunction with the inductor 11, the diode 12, and the capacitor 13.

Referring back to FIG. 1, the DC/DC converter 16 converts an output voltage of power output from the power converting unit 10 into a DC link voltage Vlink. The DC link unit 20 is connected between a first node N1 and the bidirectional inverter 30, and maintains the DC link voltage Vlink of the first node N1. A level of a voltage at the first node N1 may become unstable, e.g., due to an instantaneous voltage drop of the power generation system 2 or the grid 3 or a peak load occurrence in the load 4. However, the voltage at the first node N1 needs to be stabilized for the bidirectional inverter 30 and the bidirectional converter 50 to operate normally. The DC link unit 20 may be a capacitor, e.g., an aluminum electrolytic capacitor, a polymer capacitor, a multi-layer ceramic capacitor (MLCC), and so forth.

The bidirectional inverter 30 is a power converter connected between the DC link unit 20 and the first switch 60. The bidirectional inverter 30 converts the DC link voltage Vlink output from the power generation system 2 or the battery 30 into an alternating current (AC) voltage and outputs the AC voltage. The bidirectional inverter 30 rectifies an AC voltage output from the grid 3 into the DC link voltage Vlink to be stored in the battery 40. The bidirectional inverter 30 may include a filter for removing harmonics from the AC voltage output from the grid 3, and a phase-locked loop (PLL) circuit for matching a phase of the AC voltage output from the grid 3 to a phase of the AC voltage output from the bidirectional inverter 30 in order to prevent generation of reactive power. Also, the bidirectional inverter 30 may perform other functions, e.g., restriction of voltage variation range, power factor correction, removal of DC components, transient phenomenon protection, and so forth.

The battery 40 receives and stores power generated by the power generation system 2 or power output from the grid 3, and supplies power stored to the load 4 or the grid 3. The battery 40 may include one or more battery cells, and each of the battery cells may include a plurality of bare cells. The battery 40 may be any of various types of batteries, e.g., a nickel-cadmium battery, a lead acid battery, a nickel metal hydride (NiMH) battery, a lithium ion battery, and a lithium polymer battery. The number of the batteries 40 may be determined based on power capacity and design conditions required by the power storage system 1. For example, if power consumed by the load 4 is high, the power storage system 1 may include a plurality of the batteries 40, and if power consumed by the load 4 is small, the power storage system 1 may include only one battery 40.

The BMS 41 is connected to the battery 40, and controls charging and discharging of the battery 40 under the control of the integrated controller 80. The BMS 41 may perform overcharge protection, over-discharge protection, over-current protection, overvoltage protection, overheat protection, and cell balancing in order to protect the battery 40. To this end, the BMS 41 may monitor a voltage, a current, a temperature, a remaining amount of power, a lifetime, and a state of charge of the battery 40, and transmit information about the above listed to the integrated controller 80. Although the BMS 41 is separate from the battery 40 in FIG. 1, the BMS 41 and the battery 40 may be integrated as a battery pack.

The bidirectional converter 50 performs DC-DC conversion by converting a voltage of power output from the battery 40 into the DC link voltage Vlink required by the bidirectional inverter 30. The bidirectional converter 50 performs DC-DC conversion by converting charge power introduced through the first node N1 into a voltage required by the battery 40. Here, the term "charge power" may refer to, for example, power generated by the power generation system 2 or power supplied from the grid 3 through the bidirectional inverter 30.

The first switch 60 and the second switch 61 are connected in series between the bidirectional inverter 30 and the grid 3, and control the flow of current between the power generation system 2 and the grid 3 by being turned on or off under the control of the integrated controller 80. The first switch 60 and the second switch 61 may be turned on or off according to states of the power generation system 2, the grid 3, and the battery 40. For example, if power required by the load 4 is high, both the first switch 60 and the second switch 61 may be turned on to use all power of the power generation system 2 and the grid 3. If power required by the load 4 is greater than power supplied from the power generation system 2 and the grid 3, power stored in the battery 40 may also be supplied. If there is a power failure in the grid 3, the second switch 61 is turned off and the first switch 60 is turned on. Accordingly, power from the power generation system 2 or the battery 40 may be supplied to the load 4, but may not flow into the grid 3, thereby preventing a worker who works at a power distribution line of the grid 3 or the like from getting an electric shock.

The power measuring unit 70 measures the amount of power consumed by the load 4. The power measuring unit 70 may include a voltage measuring unit 71 for measuring a voltage applied to the load 4 and a current measuring unit 72 for measuring a current supplied to the load 4 in order to measure the amount of power consumed by the load 4. Information about the voltage and the current measured by the power measuring unit 70 is transmitted to the integrated controller 80.

The integrated controller 80 monitors the states of the power generation system 2, the grid 3, the battery 40, and the load 4, and controls the power converting unit 10, the DC/DC converter 16, the bidirectional inverter 30, the BMS 41, the bidirectional converter 50, the first switch 60, and the second switch 61 according to results of the monitoring.

The integrated controller 80 receives the information about the voltage and the current measured by the power measuring unit 70, and calculates the amount of power consumed by the load 4 by multiplying the voltage by the current. Since the power measuring unit 70 continuously measures the voltage and the current of the load 4, the integrated controller 80 may measure a change in the amount of power consumed by the load 4 as time passes. The integrated controller 80 determines whether the power converting unit 10 operates in the MPPT control mode or the voltage control mode according to the change in the amount of power consumed by the load 4. In the voltage control mode, a boosting ratio is adjusted according to the change in the amount of power consumed by the load 4.

<Method of Determining Control Mode of Power Converter According to an Embodiment of the Present Invention>

Figure 3:
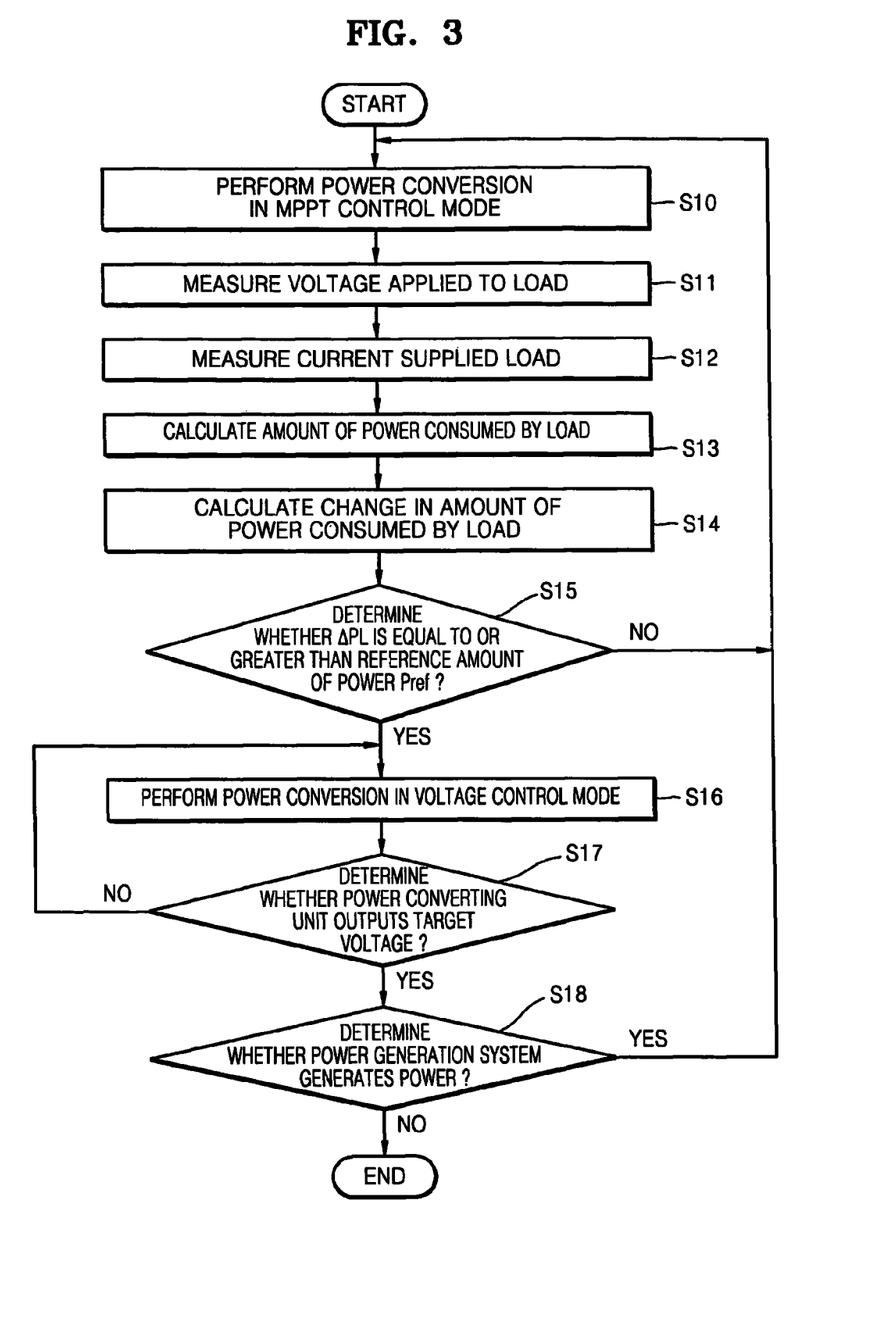
FIGS. 3 and 4 illustrate flowcharts of a method of controlling the power storage system of FIG. 1, according to an embodiment of the present invention.
Figure 4:
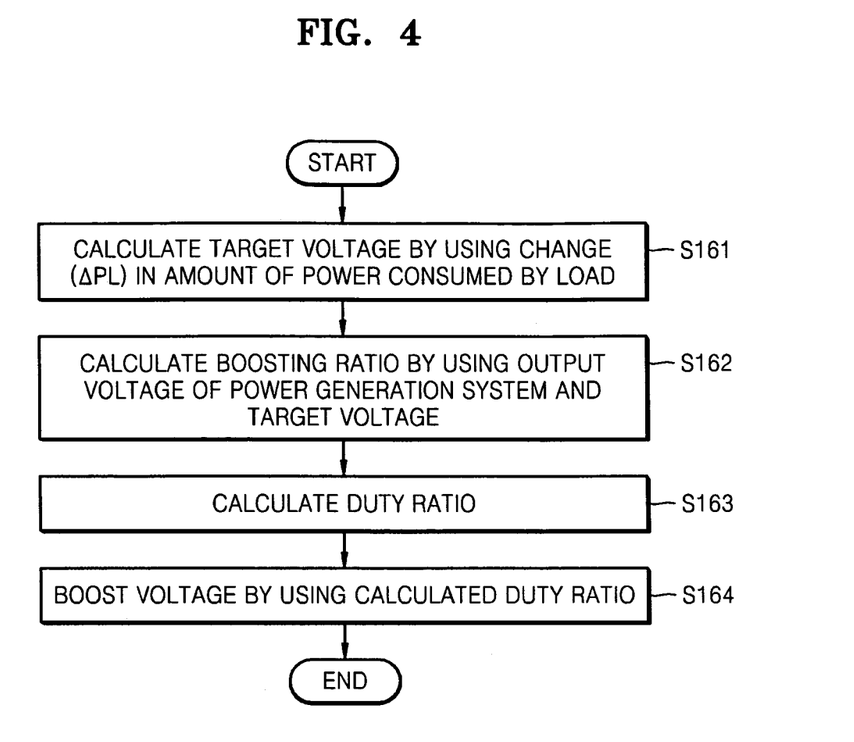

FIGS. 3 and 4 illustrate flowcharts of a method of controlling the power storage system 1 of FIG. 1, according to an embodiment of the present invention.

Referring to FIG. 3, in operation S10, the power storage system 1 performs power conversion on power generated by the power generation system 2 in the MPPT control mode during initial operation or when a change in the amount of power consumed by the load 4 is small. Since the power converting unit 10 operates in the MPPT control mode, a voltage and a current output from the power generation system 2 are gradually changed so as to track a maximum power point.

In operations S11 and S12, the power measuring unit 70 measures a voltage applied to the load 4 and a current supplied to the load 4 in real time.

In operation S13, information about the voltage and the current is transmitted to the integrated controller 80, and the integrated controller 80 calculates the amount of power consumed by the load 4 by multiplying the voltage by the current. In operation S14, a change $\Delta PL$ in the amount of power consumed by the load 4 is calculated by repeatedly calculating the amount of power consumed by the load 4 continuously or at predetermined time intervals and then calculating the changed amount of power.

In operation S15, the integrated controller 80 or the power converting unit 10 determines whether the change $\Delta PL$ in the amount of power consumed by the load 4 is equal to or greater than a reference amount of power Pref. If it is determined in operation S15 that the change ΔPL in the amount of power consumed by the load 4 is equal to or greater than the reference amount of power Pref, the method proceeds to operation S16. In operation S16, the power converting unit 10 changes to the voltage control mode. If it is determined in operation S15 that the change ΔPL in the amount of power consumed by the load 4 is less than the reference amount of power Pref, however, the power converting unit 10 continues to operate in the MPPT control mode.

The reference amount of power Pref will now be explained.

In the related art, the power converting unit 10 generally operates only in the MPPT control mode. This is because since maximum power may be extracted from the power generation system 2 in the MPPT control mode, power generation efficiency is high. However, it takes a lot of time to reach a target amount of power or a voltage corresponding to the target amount of power by using an MPPT algorithm. The MPPT algorithm involves comparing currently measured power with previously measured power, increasing or decreasing a current and a voltage according to a result of the comparison, and tracking a maximum power point by repeatedly performing the aforesaid operations. In order to make precise control around the maximum power point, the increment and the decrement need to be small. Accordingly, if there is a large change in the amount of power consumed by the load 4, it takes a lot of time to output the amount of power required by the load 4. For example, twenty calculations should be performed in total when the amount of power that may be changed within one loop of the MPPT algorithm is 5 kWh and a change in the amount of power consumed by the load 4 is 100 kWh.

In the voltage control mode, since a boosting ratio is calculated and a voltage is boosted to a target voltage by the calculated boosting ratio, a lot of calculations are not performed. That is, once a change in the amount of power consumed by the load 4 is calculated and a boosting ratio is determined to be proportional to the change in the amount of power consumed by the load 4, a duty ratio may be calculated from the determined boosting ratio. A boosting ratio of such a converter as shown in FIG. 2 is 1-D:1 where D is a duty ratio of the switching element 14, and the boosting ratio may be increased by making the duty ratio D closer to 1 as the change in the amount of power consumed by the load 4 increases. For example, if the duty ratio D is 0.5, the boosting ratio is 0.5:1 and thus an output voltage is two times greater than an input voltage. If the duty ratio D is 0.9, the boosting ratio is 0.1:1 and thus an output voltage is 10 times greater than an input voltage. That is, the voltage control mode may cope with a change in the amount of power consumed by the load 4 by calculating only a duty ratio.

Accordingly, the reference amount of power Pref may be determined so that a time taken to supply power required by the load 4 (that is, a time taken to change a voltage to a target voltage) in the voltage control mode is equal to or less than a time taken to supply power required by the load 4 (that is, a time taken to change the voltage to the target voltage) in the MPPT control mode.

If the power converting unit 10 changes to the voltage control mode in operation S16, the method proceeds to operation S17. In operation S17, it is determined whether the power converting unit 10 outputs a target voltage in the voltage control mode. Power conversion is continuously performed until the target voltage is output. If it is determined in operation S17 that the power converting unit 10 outputs the target voltage, that is, copes with a change in the amount of power consumed by the load 4, the method proceeds to operation S18. In operation S18, it is determined whether the power generation system 2 generates power. If it is determined in operation S18 that the power generation system 2 continuously generates power, the power converting unit 10 returns to the MPPT control mode to extract maximum power. If it is determined in operation S18 that the power generation system 2 does not generate power, however, power conversion is finished.

The voltage control mode will now be explained in more detail. Referring to FIG. 4, in operation S161, the integrated controller 80 calculates a target voltage to be output by using the change in the amount of power consumed by the load 4 calculated in operation S14. In operation S162, a boosting ratio for outputting the calculated target voltage is calculated. In operation S163, a duty ratio of the switching element 14 for achieving the calculated boosting ratio is calculated. In operation S164, an output voltage from the power generation system 2 is boosted by controlling the switching element 14 to be turned on or off according to the calculated duty ratio.

Figure 5:
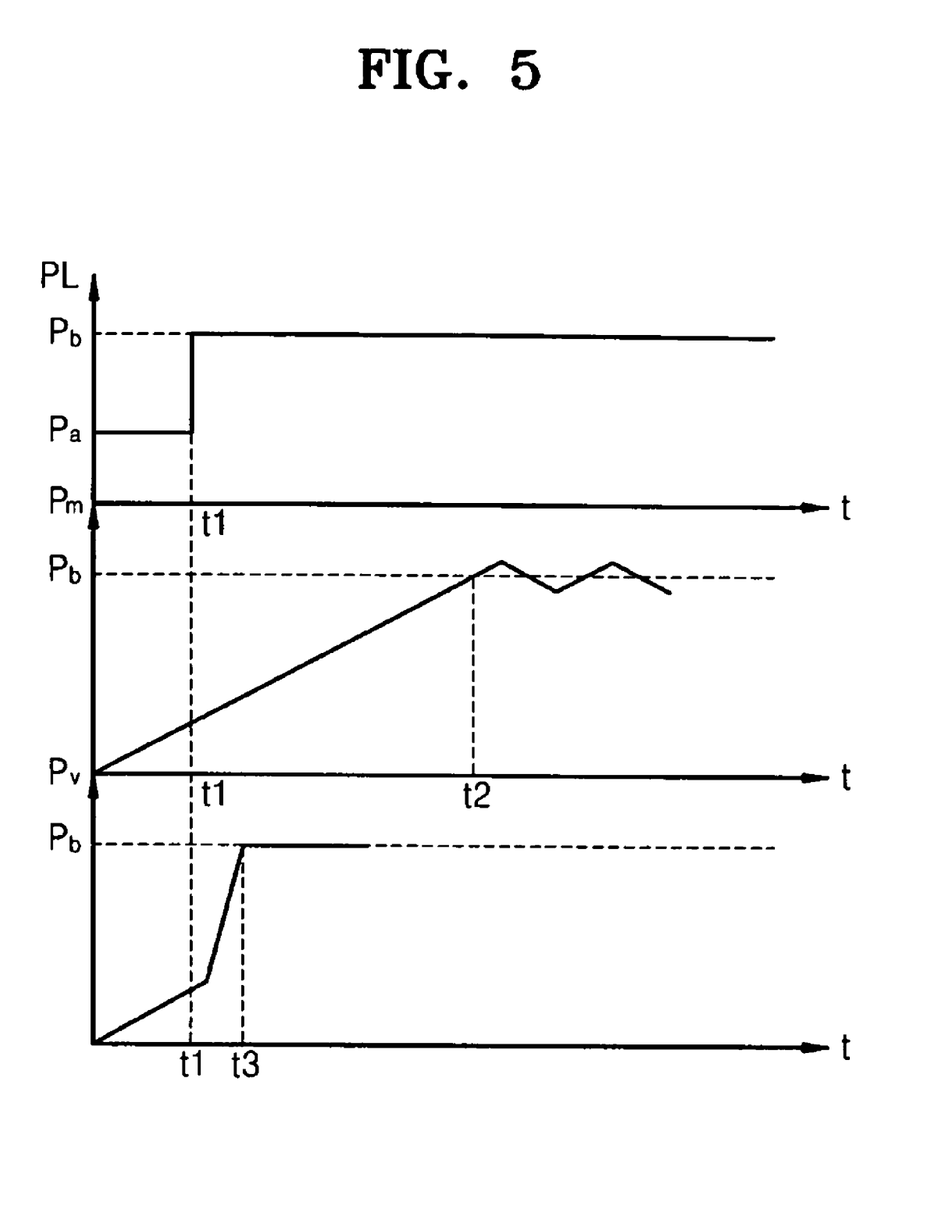
FIG. 5 is a graph illustrating a relationship between time and the amount of power consumed by a load and a relationship between time and an output of the power converting unit of FIG. 2.

FIG. 5 illustrates a graph of a relationship between time and the amount of power consumed by the load 4 and a relationship between time and an output of the power converting unit 10 of FIG. 2.

Referring to FIG. 5, an upper or first graph illustrates a change in the amount of power consumed by the load 4 as time passes. A middle or second graph illustrates output power of the power converting unit 10 in the MPPT control mode as time passes. A lower or third graph illustrates output power of the power converting unit 10 in the voltage control mode as time passes. In each of the first through third graphs, the horizontal axis represents time and the vertical axis represents power.

In the first graph, the amount of power consumed by the load 4 drastically increases at time t1 by an increment Pb—Pa. It is assumed that the increment Pb—Pa is greater than the reference amount of power Pref.

In the second graph, if the power converting unit 10 operates in the MPPT control mode even after time t1, power required by the load 4 is not supplied until time t2, and may be unstable even after time t2.

In the third graph, if the power converting unit 10 changes to the voltage control mode after t1, power required by the load 4 is supplied at time t3, i.e., a time earlier than time t2.

Since the MPPT control mode or the voltage control mode is appropriately selected according to a change in the amount of power consumed by the load 4, the power storage system 1 may quickly cope with the change in the amount of power consumed by the load 4.

<Power Storage System According to Another Embodiment of the Present Invention>

Figure 6:
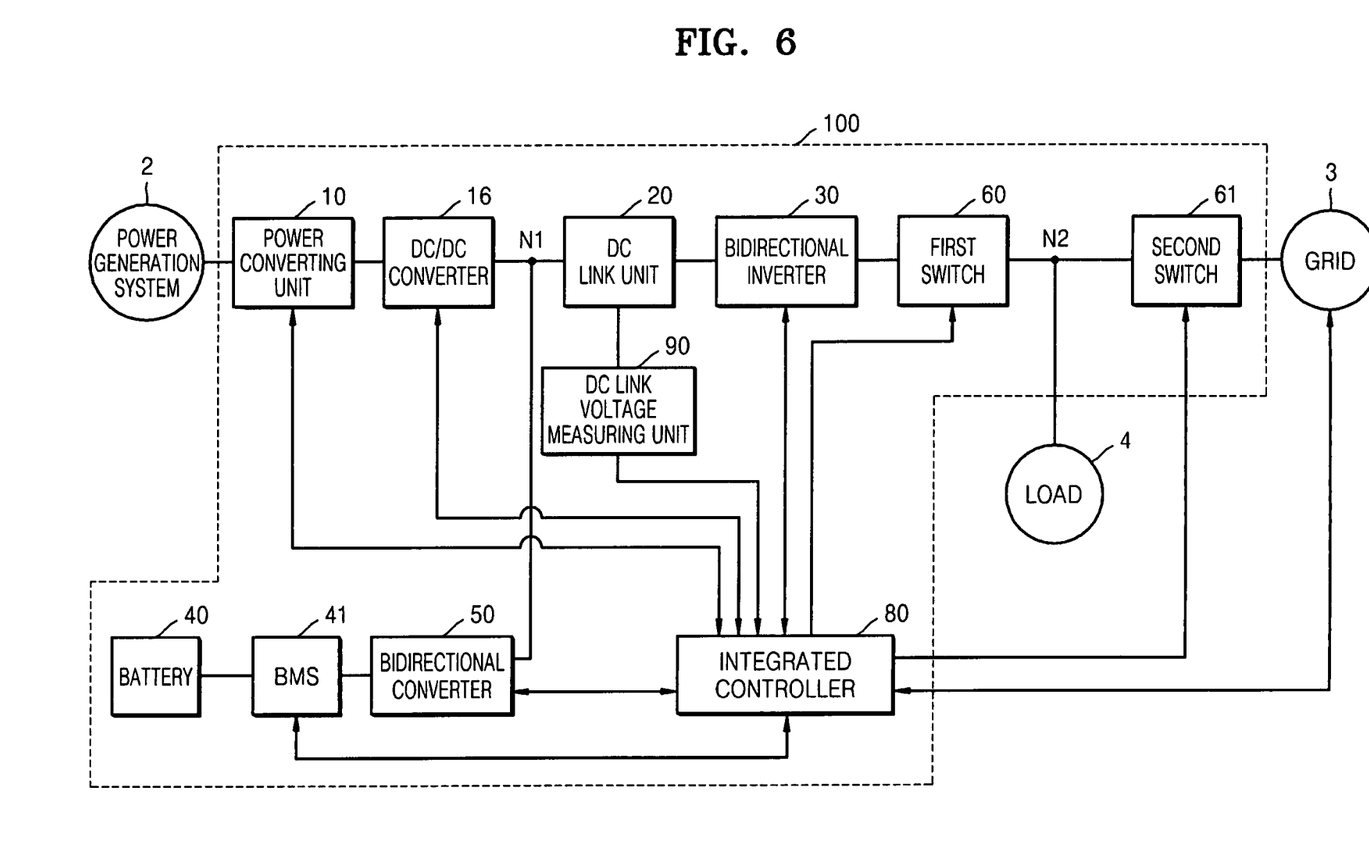
FIG. 6 is a block diagram of a power storage system according to another embodiment of the present invention.

FIG. 6 illustrates a block diagram of a power storage system 100 according to another embodiment of the present invention. Since the power storage system 100 is similar to the power storage system 1 in terms of configuration and function, the following explanation will be made by focusing on differences therebetween.

The power storage system 100 includes a DC link voltage measuring unit 90 for measuring a DC link voltage Vlink. The DC link voltage measuring unit 90 may predict the amount of power consumed by the load 4 from a change in the DC link voltage Vlink. Since a level of the DC link voltage Vlink is very high, the DC link voltage measuring unit 90 may include a voltage divider. Information about the DC link voltage Vlink measured by the DC link voltage measuring unit 90 is transmitted to the integrated controller 80.

The integrated controller 80 receives the information about the DC link voltage Vlink from the DC link voltage measuring unit 90, and calculates a change in the DC link voltage Vlink. The integrated controller 80 determines whether the power converting unit 10 is to operate in an MPPT control mode or a voltage control mode according to the change in the amount of the DC link voltage Vlink. Since the DC link voltage Vlink is affected by the amount of power consumed by the load 4, the determining of whether to use the MPPT control mode or the voltage control mode is similar to determining of whether to use the MPPT control mode or the voltage control mode according to the change in the amount of power consumed by the load 4 in the embodiment according to FIG. 1. In the voltage control mode, the integrated controller 80 adjusts a boosting ratio in the power converting unit 10 according to the change in the DC link voltage Vlink.

<Method of Determining Control Mode of Power Converter According to Another Embodiment of the Present Invention>

Figure 7:
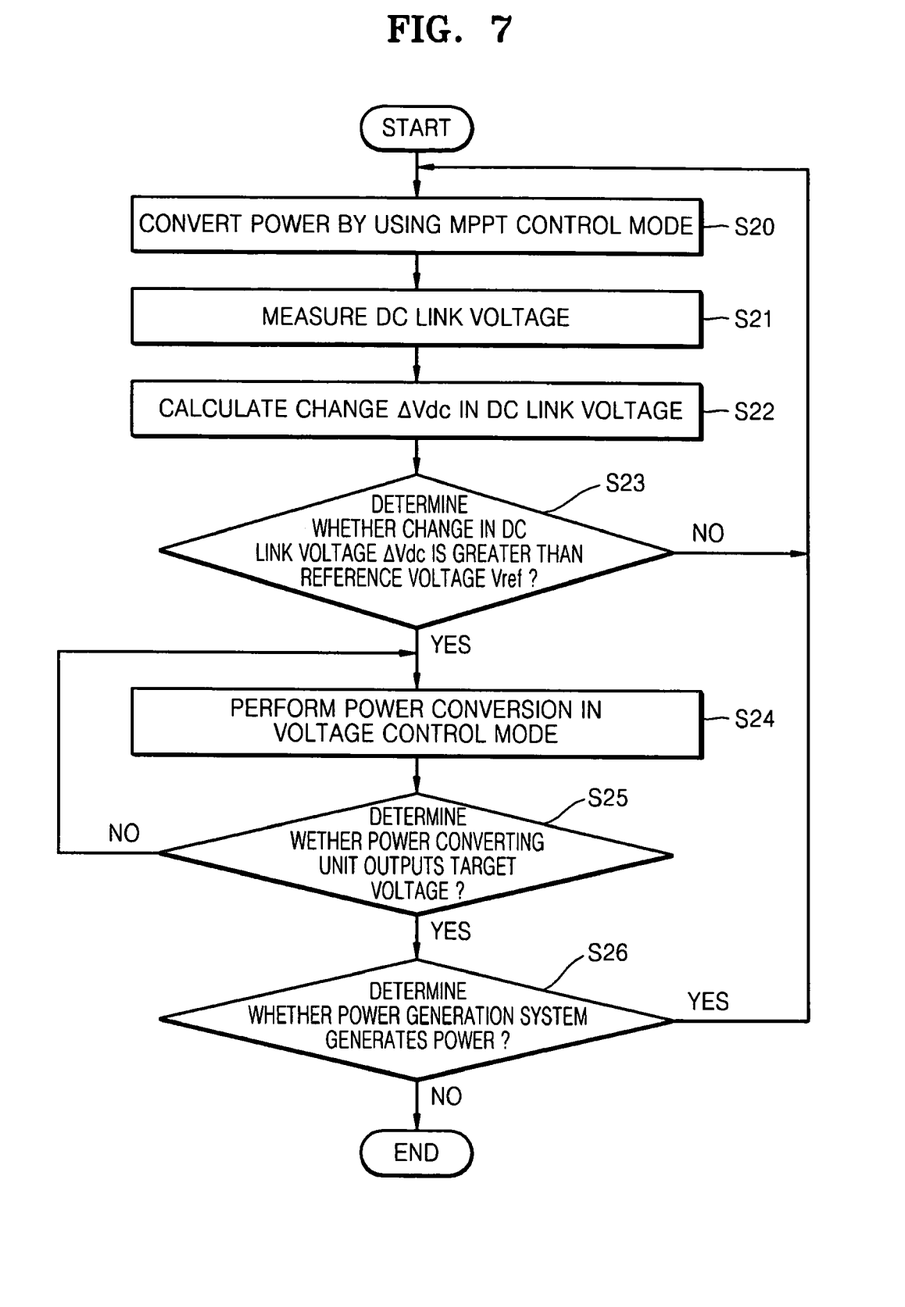
FIGS. 7 and 8 illustrate flowcharts of a method of controlling the power storage system of FIG. 6, according to another embodiment of the present invention.
Figure 8:
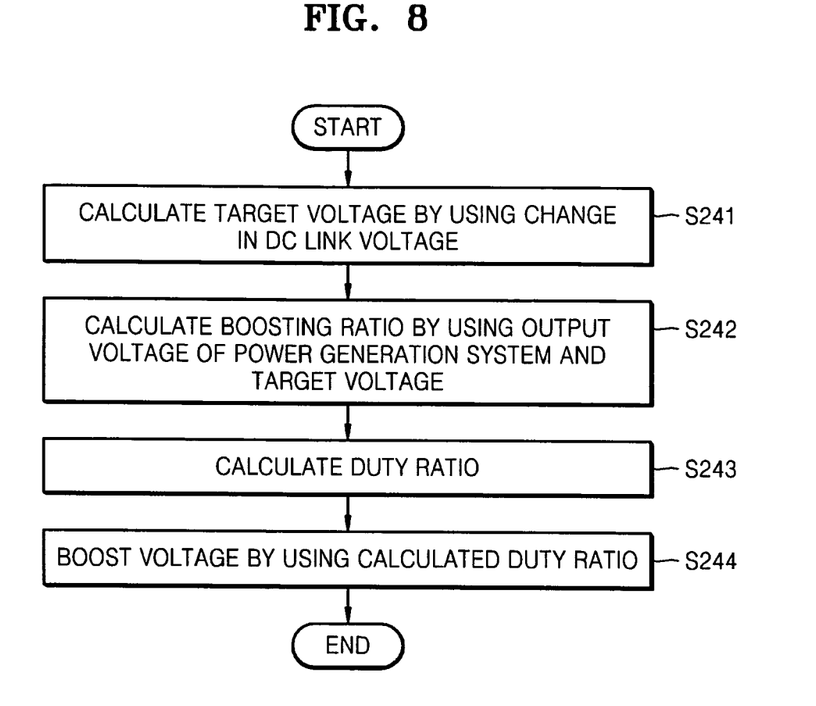

FIGS. 7 and 8 illustrate flowcharts of a method of controlling the power storage system 100 of FIG. 6, according to another embodiment of the present invention.

The method of FIG. 7 is similar to the method of FIG. 3 except that in operations S21 through S23, a change in a DC link voltage Vlink is measured and it is determined whether the DC link voltage Vlink is greater than a reference voltage to determine whether the power converting unit 10 is to operate in the MPPT control mode or the voltage control mode, unlike in operations S11 through S15 of FIG. 3.

The method of FIG. 8 is similar to the method of FIG. 4 except that in the voltage control mode, a target voltage, a boosting ratio, and a duty ratio are calculated using the change in the DC link voltage Vlink, instead of a change in the amount of power consumed by the load 4.

Since the MPPT control mode or the voltage control mode is appropriately selected according to the change in the DC link voltage Vlink, the power storage system 100 may quickly cope with a change in the amount of power consumed by the load 4.

A program for executing the methods according to the embodiments of the present invention in the power storage systems according to the embodiments of the present invention may be stored in a recording medium. The recording medium is a medium that may be read by a processor. The recording medium may be a semiconductor recording medium (e.g., a flash memory), or a magnetic storage medium (e.g., a read-only memory (ROM) or a hard disk). For example, the program may be stored in a memory installed in the integrated controller 80 of FIGS. 1 and 6. The recording medium may be read and executed by a processor, for example, the integrated controller 80 of FIGS. 1 and 6.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A power storage system for supplying power to a load by connecting a power generation system and a grid, the power storage system comprising:
   a power converting unit operating in one of at least two control modes including a maximum power point tracking (MPPT) control mode in which the power generation system is controlled to generate maximum power and a voltage control mode in which a boosting ratio is adjusted according to a change in an amount of power consumed by a load, the control mode being determined according to the change in the amount of power consumed by the load;
   a direct current (DC)/DC converter for converting an output voltage of the power converting unit into a DC link voltage;
   an inverter for converting the DC link voltage into an alternating current (AC) voltage appropriate for the grid;
   an integrated controller for controlling operations of the power converting unit, the DC/DC converter, and the inverter; and
   a power measuring unit for measuring the amount of power consumed by the load,
   wherein the power converting unit operates in the voltage control mode if the change in the amount of power consumed by the load is equal to or greater than a reference amount of power, and operates in the MPPT control mode if the change in the amount of power consumed by the load is less than the reference amount of power.

2. The power storage system as claimed in claim 1, wherein the voltage control mode is a mode in which the boosting ratio is adjusted in proportion to the change in the amount of power consumed by the load.

3. The power storage system as claimed in claim 2, wherein the boosting ratio is adjusted by adjusting a duty ratio of a switching element included in the power converting unit.

4. The power storage system as claimed in claim 1, wherein the reference amount of power is determined so that a time taken to change the output voltage of the power converting unit to a target voltage in the voltage control mode is equal to or less than a time taken to change the output voltage of the power converting unit to the target voltage in the MPPT control mode.

5. The power storage system as claimed in claim 1, wherein the power measuring unit comprises:
   a voltage measuring unit for measuring a voltage applied to the load; and
   a current measuring unit for measuring a current supplied to the load,
   wherein the integrated controller calculates the amount of power consumed by the load by multiplying the voltage by the current.

6. The power storage system as claimed in claim 1, further comprising a DC link unit for maintaining the DC link voltage at a constant level.

7. A power storage system for supplying power to a load by connecting a power generation system and a grid, the power storage system comprising:
   a power converting unit operating in one of at least two control modes including a maximum power point tracking (MPPT) control mode in which the power generation system is controlled to generate maximum power and a voltage control mode in which a boosting ratio is adjusted according to a change in an amount of power consumed by a load, the control mode being determined according to the change in the amount of power consumed by the load, wherein the power converting unit operates in the voltage control mode if a change in the DC link voltage is equal to or greater than a reference voltage, and operates in the MPPT control mode if the change in the DC link voltage is less than the reference voltage;
   a direct current (DC)/DC converter for converting an output voltage of the power converting unit into a DC link voltage;

an inverter for converting the DC link voltage into an alternating current (AC) voltage appropriate for the grid; and an integrated controller for controlling operations of the power converting unit, the DC/DC converter, and the inverter.

8. The power storage system as claimed in claim 7, wherein the voltage control mode is a mode in which the boosting ratio is adjusted according to the change in the DC link voltage.

9. The power storage system as claimed in claim 8, wherein the boosting ratio is adjusted by adjusting a duty ratio of a switching element included in the power converting unit.

10. A method of controlling a power storage system for supplying power to a load by connecting a power generation system and a grid, the method comprising:

determining a control mode in accordance with the change in the amount of power consumed by the load from at least two control modes including a maximum power point tracking (MPPT) control mode in which the power generation system is controlled to generate maximum power and a voltage control mode in which a boosting ratio is adjusted according to a change in an amount of power consumed by a load;

converting power generated by the power generation system into power having a DC link voltage in the determined control mode;

converting the power having the DC link voltage into power having an alternating current (AC) voltage appropriate for the grid; and measuring the amount of power consumed by the load, wherein the voltage control mode is determined as the control mode if the change in the amount of power consumed by the load is equal to or greater than a reference amount of power, and the MPPT control mode is determined as the control mode if the change in the amount of power consumed by the load is less than the reference amount of power.

11. The method as claimed in claim 10, wherein measuring the amount of power consumed by the load comprises:

measuring a voltage applied to the load;
measuring a current supplied to the load; and
calculating the amount of power consumed by the load by multiplying the voltage by the current.

12. The method as claimed in claim 10, wherein the voltage control mode includes adjusting the boosting ratio in proportion to the change in the amount of power consumed by the load.

13. The method as claimed in claim 12, wherein adjusting the boosting ratio includes adjusting a duty ratio of a switching element.

14. A method of controlling a power storage system for supplying power to a load by connecting a power generation system and a grid, the method comprising:

determining a control mode in accordance with the change in the amount of power consumed by the load from at least two control modes including a maximum power point tracking (MPPT) control mode in which the power generation system is controlled to generate maximum power and a voltage control mode in which a boosting ratio is adjusted according to a change in an amount of power consumed by a load;

converting power generated by the power generation system into power having a DC link voltage in the determined control mode;

converting the power having the DC link voltage into power having an alternating current (AC) voltage appropriate for the grid; and measuring the DC link voltage, wherein the voltage control mode is determined as the control mode if a change in the DC link voltage is equal to or greater than a reference voltage, and the MPPT control mode is determined as the control mode if the change in the DC link voltage is less than the reference voltage.

15. The method as claimed in claim 14, wherein the voltage control mode includes adjusting the boosting ratio in proportion to the change in the DC link voltage.

16. The method as claimed in claim 15, wherein adjusting the boosting ratio includes adjusting a duty ratio of a switching element.

* * * * *